US012780402B2

(12) United States Patent
Orbon et al.

(10) Patent No.: US 12,780,402 B2
(45) Date of Patent: Nov. 3, 2026

(54) PROPROTOR BLADE RETENTION SYSTEM

(71) Applicant: Archer Aviation Inc., San Jose, CA (US)

(72) Inventors: James Orbon, Newport Beach, CA (US); Scott Ketcham, Oceanside, CA (US); Alan Buehne, Mission Viejo, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/685,374

(22) PCT Filed: Aug. 15, 2022

(86) PCT No.: PCT/US2022/040323

§ 371 (c)(1),
(2) Date: Feb. 21, 2024

(87) PCT Pub. No.: WO2023/027908

PCT Pub. Date: Mar. 2, 2023

(65) Prior Publication Data

US 2024/0351678 A1 Oct. 24, 2024

Related U.S. Application Data

(60) Provisional application No. 63/236,628, filed on Aug. 24, 2021.

(51) Int. Cl.

*B64C 11/06* (2006.01)
*B64C 27/48* (2006.01)
*B64C 29/00* (2006.01)

(52) U.S. Cl.

CPC .......... *B64C 11/06* (2013.01); *B64C 29/0033* (2013.01)

(58) Field of Classification Search

CPC ......... B64C 11/06; B64C 27/48; B64C 27/32; B64C 11/20; B64C 11/26; B64C 27/35;

(Continued)

(56) References Cited

U.S. PATENT DOCUMENTS 2,271,149 A * 1/1942 Di Cesare .............. B64C 11/32 416/157 R
2,304,153 A * 12/1942 Di Cesare .............. B64C 11/36 416/157 R (Continued)

FOREIGN PATENT DOCUMENTS

CN 108945424 A 9/2021
WO 9908928 2/1999
WO WO-2016005714 A1 * 1/2016 ............ B64C 11/04

OTHER PUBLICATIONS

International Search Report and Written Opinion for International Patent Application No. PCT/US2022/040323, dated Nov. 29, 2022, 11 pages.

*Primary Examiner* — Eric J Zamora Alvarez

(74) *Attorney, Agent, or Firm* — Finnegan, Henderson, Farabow, Garrett & Dunner, LLP

(57) ABSTRACT

In one aspect, a blade retention system—for a variable pitch aircraft proprotor system—may comprise a double conical blade root encapsulated by a split sleeve. Some embodiments described additionally include fail-operational features. The preload of the blade pitch bearings pushes the metallic split sleeve into the bond line with the blade root.

12 Claims, 10 Drawing Sheets

(58) Field of Classification Search

CPC ......... B64C 27/54; B64C 11/04; B64C 27/72; B64C 27/327; B64C 27/33; B64C 29/0033; F16C 2326/43; F16C 19/497; F16C 25/08; F01D 5/282; F01D 25/16; F01D 5/3023; F01D 5/3053; F05D 2230/23; F05D 2230/64; F05D 2230/644; F05D 2300/603; F05D 2240/50

See application file for complete search history.

(56) References Cited

U.S. PATENT DOCUMENTS

| | | | | |
|---|---|---|---|---|
| 3,664,764 | A * | 5/1972 | Davies | B29C 70/04 416/220 A |
| 4,142,833 | A | 3/1979 | Rybicki et al. | |
| 4,545,733 | A | 10/1985 | Schwarz et al. | |
| 5,118,256 | A * | 6/1992 | Violette | F16C 27/066 416/239 |
| 6,015,264 | A * | 1/2000 | Violette | B64C 11/20 416/207 |
| 7,192,255 | B2 * | 3/2007 | Gaiani | F16C 19/497 416/207 |
| 8,973,863 | B1 * | 3/2015 | van der Westhuizen | B64C 27/48 244/17.11 |
| 9,623,966 | B1 * | 4/2017 | van der Westhuizen | B64C 27/32 |
| 2018/0290728 | A1 * | 10/2018 | Violette | B64C 11/06 |
| 2021/0062661 | A1 * | 3/2021 | Loos | F03B 3/128 |
| 2023/0249811 | A1 * | 8/2023 | Tobin | B64C 27/33 416/134 A |

* cited by examiner

PROPROTOR BLADE RETENTION SYSTEM

PRIORITY CLAIM

This application claims priority to PCT application no. PCT/US22/40323, filed on Aug. 15, 2022; which claims priority to U.S. provisional application having Ser. No. 63/236,628, filed Aug. 24, 2021. These and all other extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is aircraft propulsion.

BACKGROUND

Large composite proprotors present many opportunities for enabling highly efficient aircraft. However, there are many challenges to using large composite rotors.

Large rotors—while more efficient than relatively smaller proprotors—generate large, complex forces. Resolving the loads of large proprotor blades can present many challenges.

Using composite materials in proprotor construction also presents challenges—notably, the challenge of attaching composite components to non-composite components. For example, attaching composite proprotor blades to a metallic hub can present challenges.

Many aircraft propulsion systems include at least one propeller, rotor, propulsor, or similar propulsion devices. For the remainder of this application, the terms proprotor and proprotor blade will be used for convenience. The term proprotor should be understood to include propeller, rotor, propulsor or any similar propulsion device despite any historical distinction. Likewise, the term proprotor blade should be understood to include propeller blade, rotor blade, propulsor blade or any similar propulsion device despite any historical distinctions.

SUMMARY

The joining of composite proprotor blades to the proprotor hub can pose several problems. Many fastener systems that work well with metal require careful design considerations when used to retain composite components. For example, bolted joints through composite materials require careful design considerations. In addition to bolted joints, bearing interfaces on composite parts also require special considerations.

Safety is a primary concern in commercial aviation. Safety critical joints that have unpredictable failures or single points of failure are to be avoided if possible.

A double conical blade root captured by a split sleeve is presented in one aspect herein. Some embodiments described additionally include fail-operational features.

DETAILED DESCRIPTION

A double conical blade root captured by a split sleeve is presented in one aspect herein. Some embodiments described additionally include fail-operational features.

Figure 3:
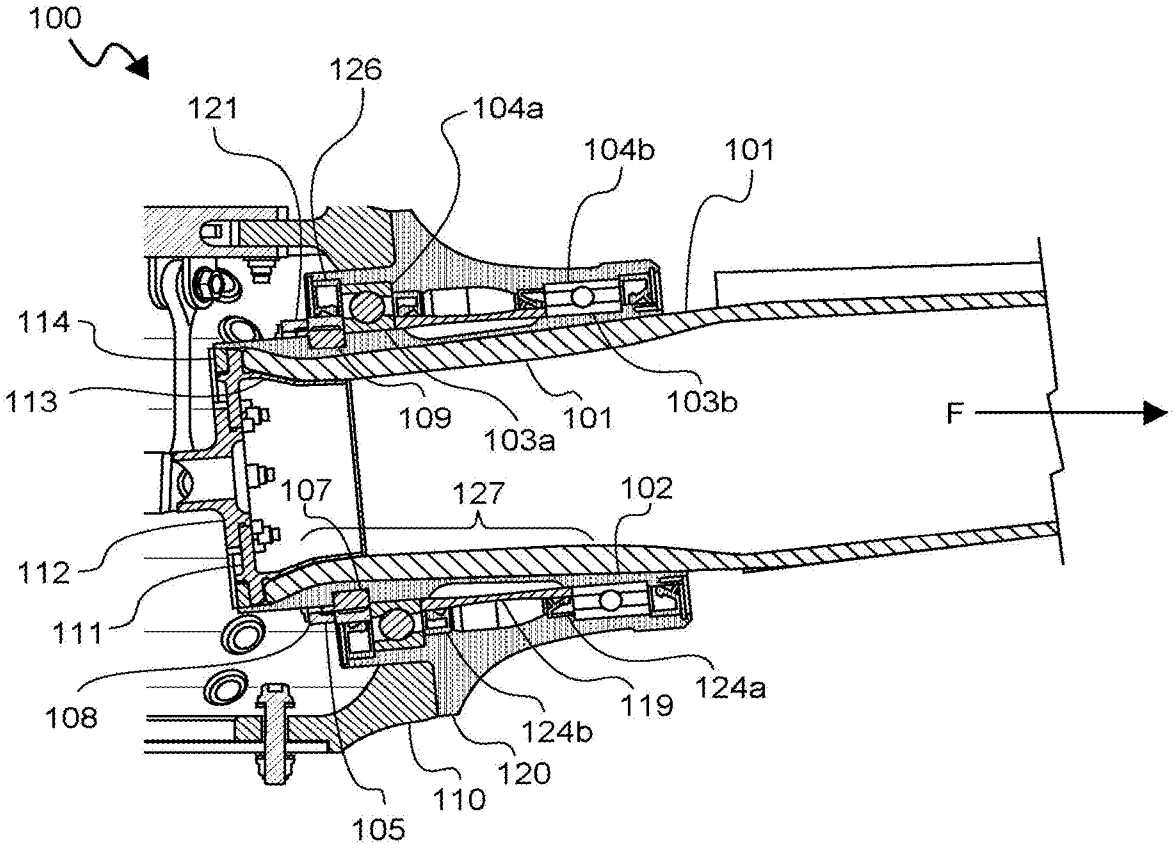
FIG. 3 illustrates a proprotor blade system comprising a double conical blade propeller root.

In one embodiment herein is a proprotor system 100 comprising a double conical proprotor blade root 101 encapsulated by a metallic split sleeve 102. The split sleeve 102 includes two bearing surfaces 103*a* and 103*b*. Inner blade pitch bearing 104*a*, proprotor blade root 101, and split sleeve 102 assembly is captured in the radial direction by fail operational bearing retention device 105. Bearing retention device 105 prevents the proprotor blade 106 from coming loose—even in the instance of some component failures. Proprotor system 100 further comprises outer blade pitch bearing 104*b*. In the embodiment of FIG. 3, the split sleeve 102 is interposed between the blade root 101 and the inner blade pitch bearing 104*a* and outer blade pitch bearing 104*b*.

In one aspect, described herein is a proprotor blade retention system that can retain proprotor blades without metal-to-composite fastener joints—for example, without the use of bolts, rivets, etc. between composite components and metal components. Some embodiments described herein additionally comprise fail-operational safety characteristics. Great advantages over conventional variable pitch blade retention systems can be achieved.

The joining of composite proprotor blades to adjacent structure can pose several problems. Many fastener systems that work well with metal or wood do not work well with composite components. For example, bolted joints through composite materials require careful design considerations. The ability to avoid bolted joints through composite structures has many advantages.

Safety is a primary concern in commercial aviation. Safety critical joints that have unpredictable failures or single points of failure are to be avoided if possible.

Figure 1:
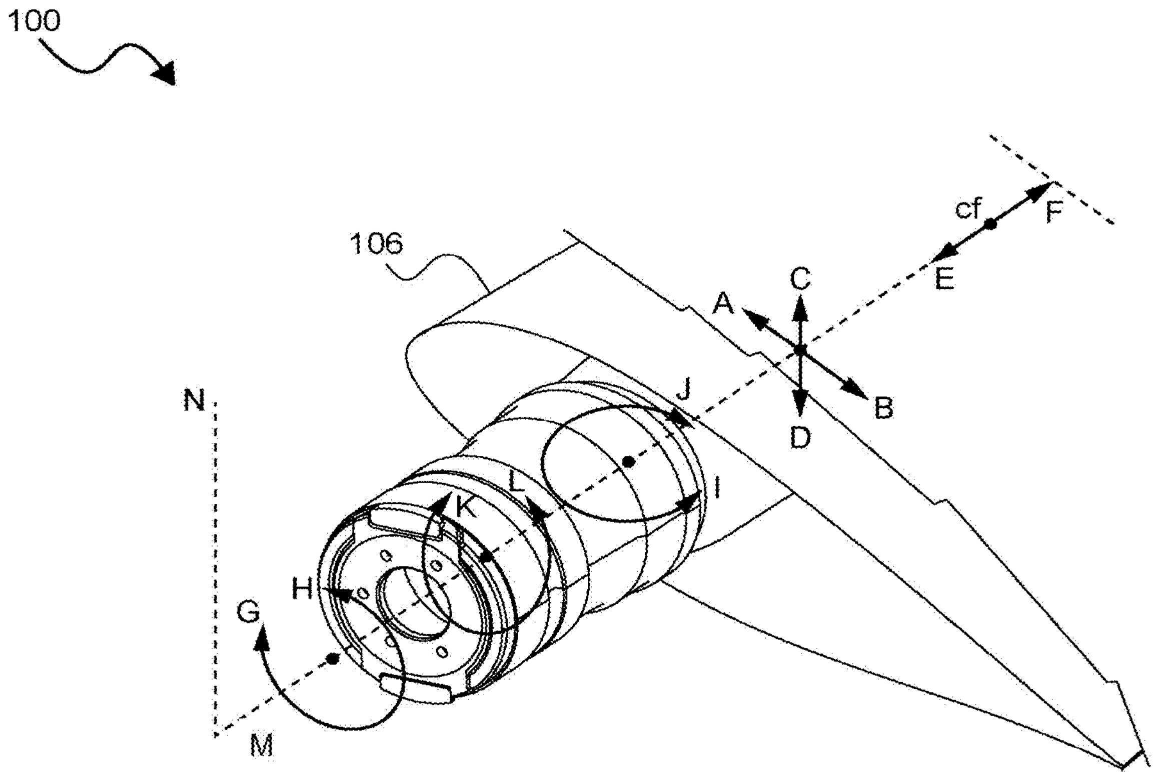
FIG. 1 illustrates axes useful in describing a proprotor blade retention system.

FIG. 1 illustrates a reference drawing useful in understanding force components that will be discussed in this application. In-plane shear force vector B corresponds to a force vector component that is normal to the plane defined by the spanwise axis M of the proprotor blade and the proprotor system's axis of rotation N. Vector B is directed towards the trailing edge of the proprotor blade at a given radial blade station while vector A is opposite to vector B (directed towards the leading edge of the proprotor blade). There are an infinite number of in-plane shear force vectors A and B corresponding to the infinite number of radial blade stations.

Also illustrated are flap-wise shear force vectors C and D. Flap-wise shear vector C exists in the plane defined by the proprotor system axis of rotation N and the proprotor blade spanwise axis M. Flap-wise shear vector C corresponds to the vector directed towards the upstream direction of proprotor airflow while vector D corresponds to the vector directed towards the downstream direction of proprotor airflow.

Centrifugal force vector F and anti-centrifugal force vector E are collinear to the spanwise axis M. Centrifugal force vector F is directed away from the proprotor axis of rotation N while anti-centrifugal force vector E is directed towards the proprotor axis of rotation N.

First torsion moment G and second torsion moment H correspond to moments about spanwise axis M. First torsion moment G is opposite in direction to torsion moment H. Torsion moments H and G correspond to what is commonly referred to as blade pitch moments or blade feather axis moments.

In-plane moments I and J exist in the plane defined by the proprotor's plane of rotation. The in-plane moments I and J have moment centers along spanwise axis M. Proprotor blade 106 will comprise an infinite number of in-plane moment centers corresponding to different radial blade stations. The spanwise distribution of in-plane moments of one embodiment is described below in the description of FIG. 2.

Flap-wise moments K and L lie in the plane defined by the proprotor system axis of rotation N and the spanwise axis M. The flap-wise moments K and L have moment centers along spanwise axis M. Proprotor blade 106 will comprise an infinite number of flap-wise moment centers corresponding to different radial blade stations. The spanwise distribution of flap-wise moments of one embodiment is described below in the description of FIG. 2.

The coordinate and vector descriptions are included merely to facilitate understanding of concepts described herein. It should be understood that embodiments of proprotor systems are complex and subject to complex forces. Forces, vectors, and coordinate systems may deviate in actual implementations.

Figure 2:
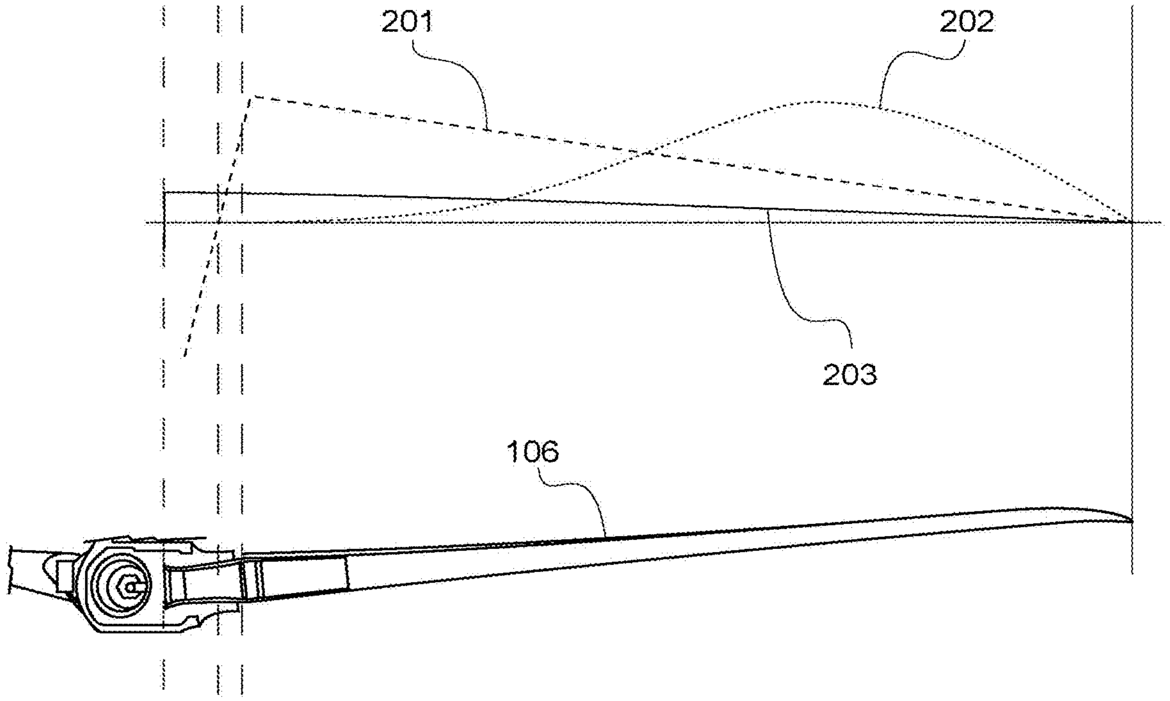
FIG. 2 illustrates forces on one embodiment of a proprotor blade.

FIG. 2 illustrates the relative distribution of different force components at different radial stations of one embodiment of proprotor blade 106.

Trendline 201 illustrates the flap-wise moment along the spanwise axis of the proprotor blade.

Trendline 202 illustrates the flap-wise shear force along the spanwise axis of the proprotor blade.

Trendline 203 illustrates the feather axis torsion load on proprotor blade 106.

FIG. 3 illustrates aspects of an embodiment of a proprotor system 100 comprising a double conical proprotor blade root 101 encapsulated by a metallic split sleeve 102. The split sleeve 102 includes two bearing surfaces 103*a* and 103*b*. Inner blade pitch bearing 104*a*, proprotor blade root 101, and split sleeve 102 assembly is captured in the radial direction by fail operational bearing retention device 105. Bearing retention device 105 prevents the proprotor blade 106 from coming loose—even in the instance of some component failures.

In the embodiment of FIG. 3, the bearing retention device 105 comprises a threaded split collar 107 and a bearing preload nut 108. The threaded split collar 107 is disposed in split collar groove 109. In the embodiment of FIG. 3, the threaded split collar 107 comprises threads on the outside diameter. The outside diameter of the threaded split collar 107 is larger than the inside diameter of inner blade pitch bearing 104*a*.

During flight, the proprotor blade will experience centrifugal force along axis F due to the rotation of the proprotor system 100. The centrifugal force will be transferred from the proprotor blade root 101 to the split sleeve 102. The centrifugal force will be transferred from the split sleeve 102 to the threaded split collar 107 as the threaded split collar 107 is pulled against the inner wall of split collar groove 109 (that is the groove wall closest to the proprotor axis of rotation N). The force is transferred—through bearing preload nut 108—to the inner race of inner blade pitch bearing 104*a*. The force is resolved into the hub 110 through inner blade pitch bearing 104*a*.

In the instance of failure of the bearing preload nut 108, the split sleeve 102 and blade root 101 can be captured by split collar 107. Because the outside diameter of the split collar 109 is larger in diameter than the inside diameter of inner blade pitch bearing 104*a*, the split collar and blade root 101 can be prevented from being pulled—by centrifugal force—out of the proprotor hub assembly.

Also shown in FIG. 3 is blade root insert 111. In the embodiment of FIG. 3, blade root insert 111 is bonded to blade root 101.

Any suitable bonding compound can be used to bond blade root insert 111 to blade root 101 including any type of suitable aerospace structural epoxy. In addition to being bonded in place, the blade root insert is mechanically captured in place by split sleeve tab 114. The split sleeve 102 comprises the split sleeve tab 114 such that once the split sleeve 102 is installed over the blade root 101 and the blade root insert 111, the blade root insert 111 is captured in place.

Figure 4:
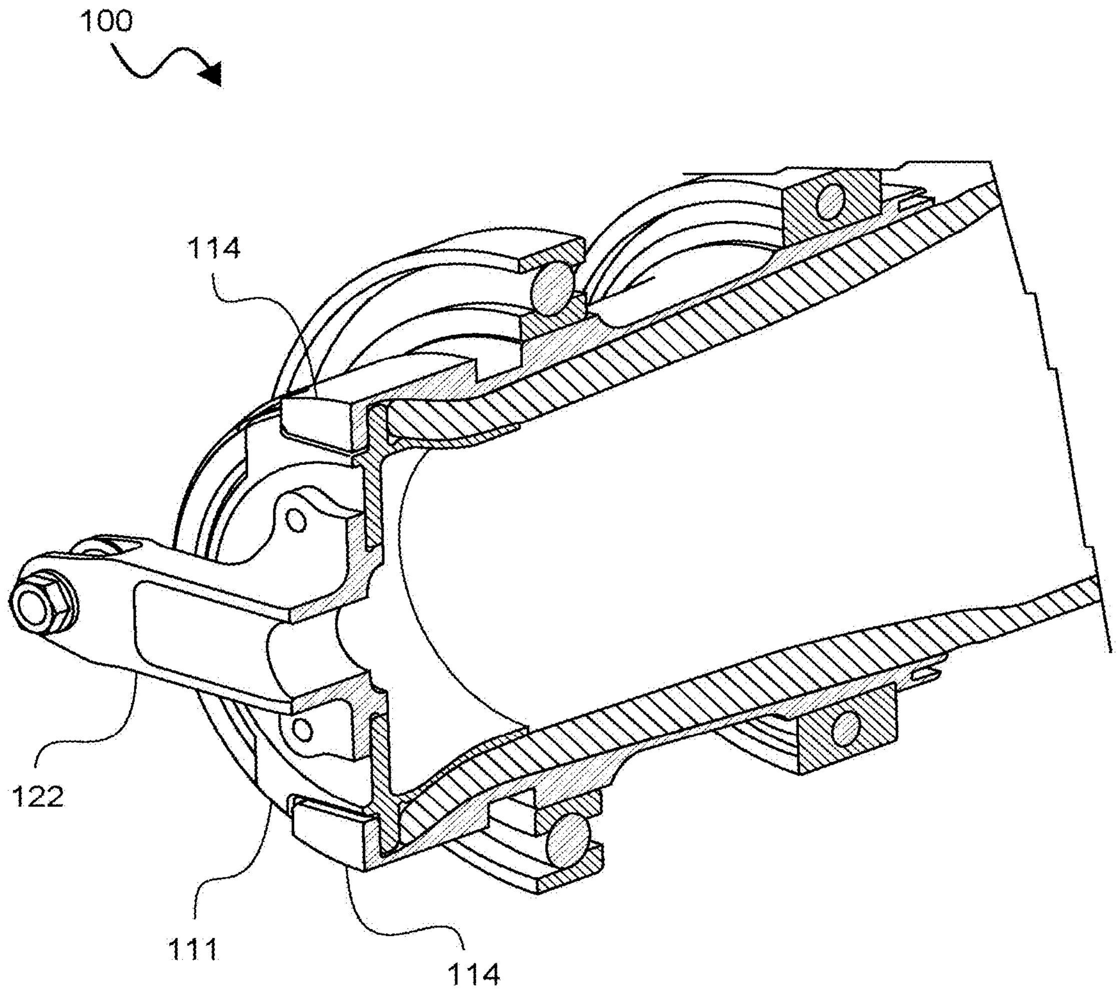
FIG. 4 shows a perspective cutaway view of a proprotor blade retention system.

FIG. 4 illustrates a perspective cutaway view of aspects of proprotor system 100. Split sleeve tabs 114 and blade root insert 111 are shown. Also shown is pitch horn 122 that can be bolted to blade root insert 111.

Figure 5:
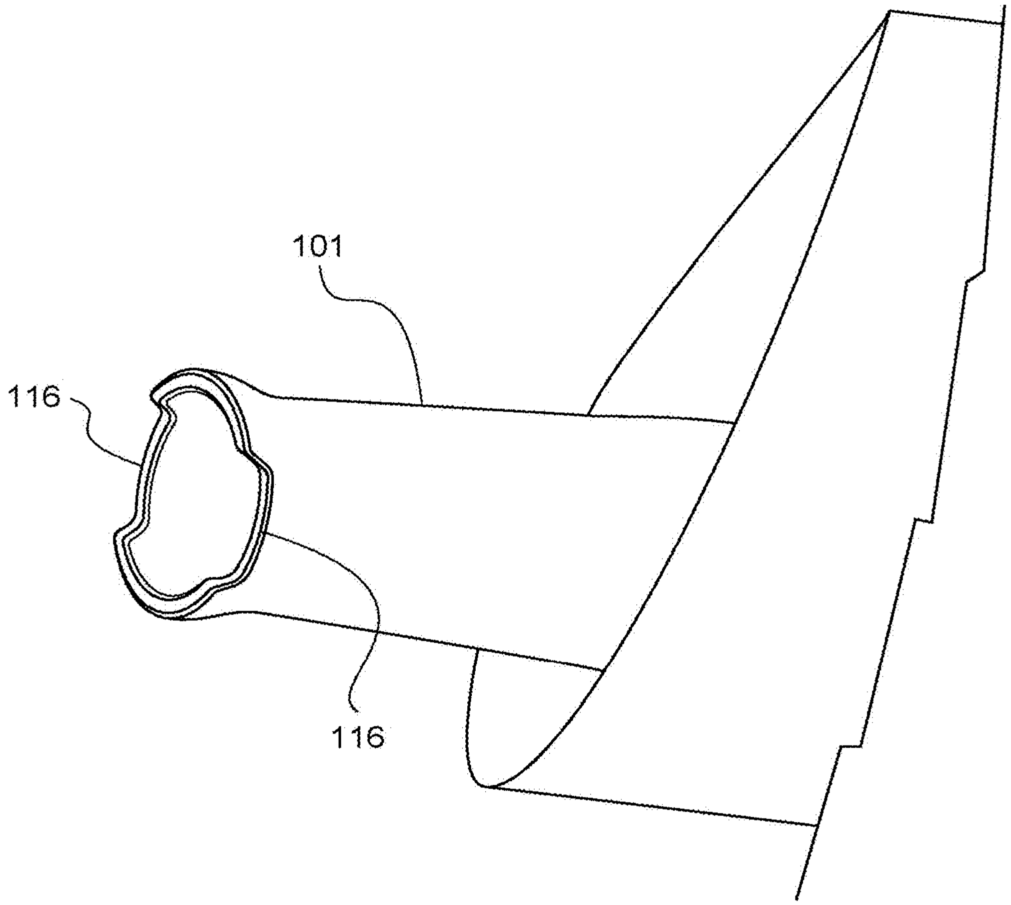
FIG. 5 shows a perspective view of a proprotor blade retention system comprising a blade root.
Figure 6:
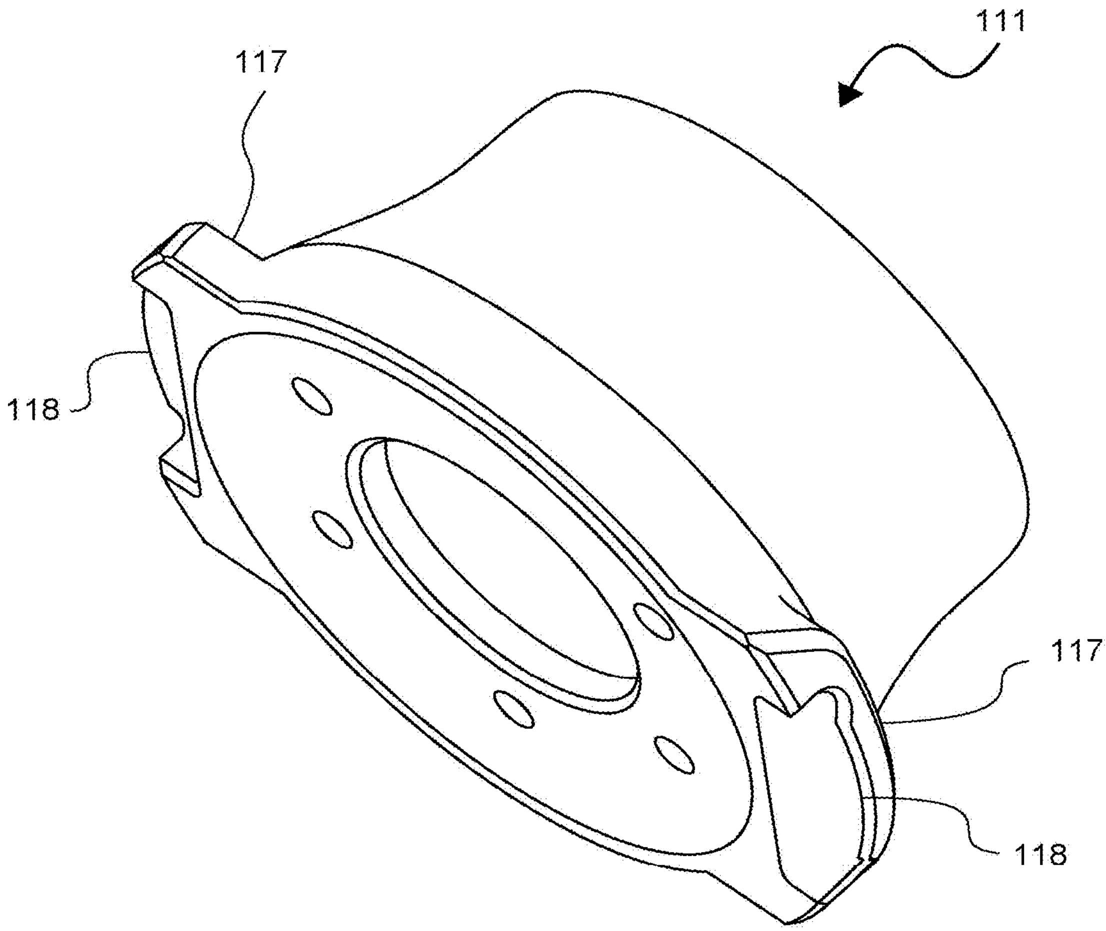
FIG. 6 illustrates a blade root insert.

FIG. 5 illustrates blade root notches 116. Blade root notches 116 are configured to transfer blade pitch torsion loads between blade root 101 and blade root insert 111. Blade root insert 111 comprises corresponding blade root insert lugs 117—shown in FIG. 6. If the bond between the blade root 101 and blade root insert 111 fails, torsion loads will be transferred between the blade root 101 and blade root insert 111 through blade root insert lugs 117 and blade root notches 116.

In other embodiments, the blade root 101 and blade root insert 111 can comprise any other suitable load transfer feature—for example, castellations, splines, or locating keys.

Figure 7:
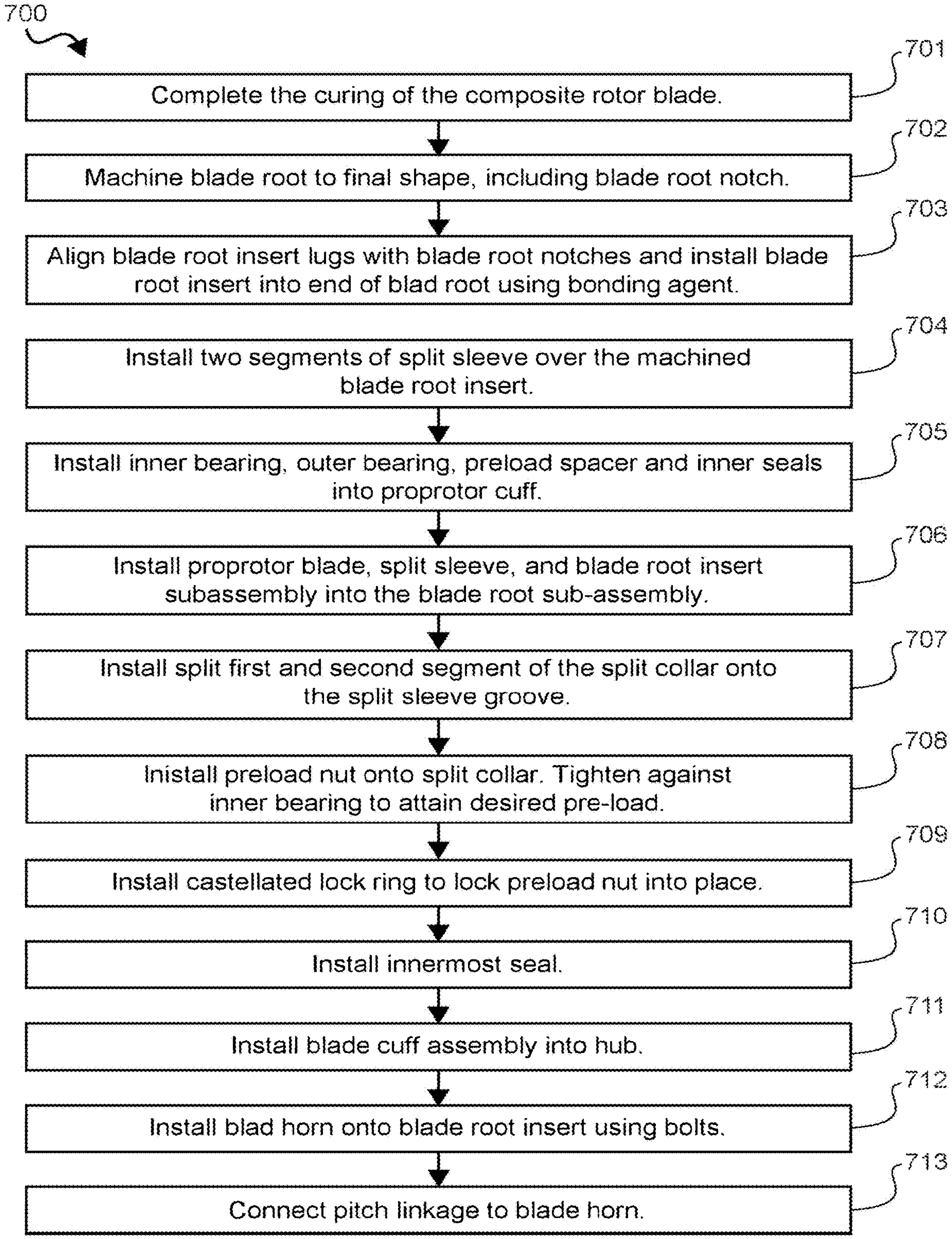
FIG. 7 illustrates one embodiment of a method for assembling the blade root retention system of FIG. 3.

FIG. 7 illustrates one embodiment of a method for manufacturing the blade root retention system of FIG. 3.

In step 701, the curing of proprotor blade 106 is completed. The blade can be any type of proprotor, rotor, propeller, or similar blade. In the embodiment of FIG. 7, the blade comprises composite. In other embodiments, the blade may comprise any suitable material including wood.

In step 702, the blade root 101 is machined to final dimensions. Curing the blade root with excess material in some places and then machining the blade root to the final dimensions can have advantages. Machine finishing the root can facilitate achieving dimensional accuracies, surface finishes, and shapes that would be difficult to achieve by molding alone.

Once the blade root is at the final profile, in step 703, the blade root insert 111 is installed. Adhesive is applied to the inside of the blade root 101 and the outside of the blade root insert 111. The load transfer lugs of the blade root insert 111 are aligned with the load transfer notches on the blade root 101. The blade root insert 111 is pressed into the blade root 101.

Figure 8:
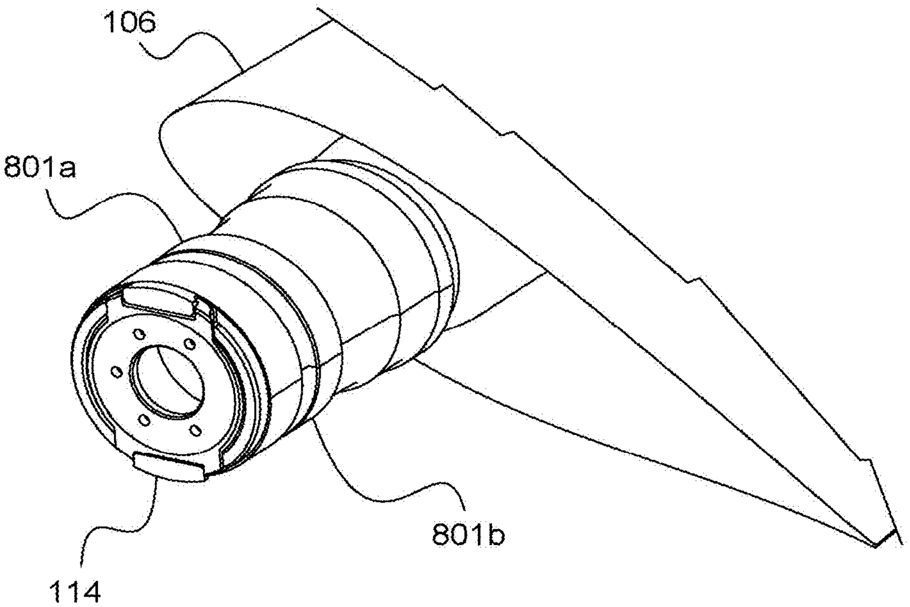
FIG. 8 illustrates an embodiment of a proprotor blade retention system including two split sleeve sections.

In step 704, adhesive is applied to the inside of the first and second split sleeve segments 801*a* and 801*b* and to the outside of the blade root 101—illustrated in FIG. 8. The blade root 101 is sandwiched between the two split sleeve segments. The split sleeve segments are installed such that split sleeve tabs 114 are engaged with the blade root insert notches 118 on proprotor blade root insert 111.

In step 705, the inner blade pitch bearing 104*a*, outer blade pitch bearing 104*b*, preload spacer 119 and inner seals 124*a* and 124*b* are installed into the proprotor blade cuff 120.

In step 706, the proprotor blade 106, split sleeve, and blade root insert subassembly are installed into the blade root sub-assembly.

In step 707, the first and second segment of the split collar 107 are installed onto the split sleeve groove.

In step 708, the preload nut 108 is installed onto the split collar 107. The preload nut 108 is tightened against the inner blade pitch bearing 104*a* to achieve the desired pre-load.

In the embodiment of FIG. 3, preload system 127 comprises preload nut 108, preload spacer 119, and split collar 107. The preload system 127 is configured to maintain the split sleeve 102 in compression against the blade root 101, in an inward direction along the blade pitch axis and outward direction along the blade pitch axis.

In step 709, the lock ring 121 is installed into place to lock the preload nut 108 into place. The lock ring 121 is slid onto threaded split collar 107 and engages bearing preload nut 108. The lock ring 121—as well as the preload nut 108 and split collar 107—comprises vernier castellations 125 that minimize the increments between available locking positions. The feature allows the bearing preload nut to be tightened to within a small window of a desired preload amount and still allow for the lock ring 121 to be installed. A snap ring, safety wire, or other retaining feature can be used to retain the lock ring 121.

In step 710, the blade cuff to preload nut seal 126 is installed.

In step 711, the blade cuff 120 sub-assembly is installed onto the hub 110.

One advantage of this embodiment is that the blade and retention hardware can be assembled on a bench top before final assembly with the proprotor hub and the other proprotor blades. Furthermore, individual blades and the associated retention hardware can be replaced—simplifying maintenance, repair, and overhaul.

In step 712, the blade horn 122—illustrated in FIG. 4—is installed onto blade root insert 111 using bolts. In other embodiments the blade horn and the blade root insert 111 and blade horn 122 may be one piece.

In step 713, a pitch linkage-driven by an actuator—is connected to the blade pitch horn 122.

Figure 9:
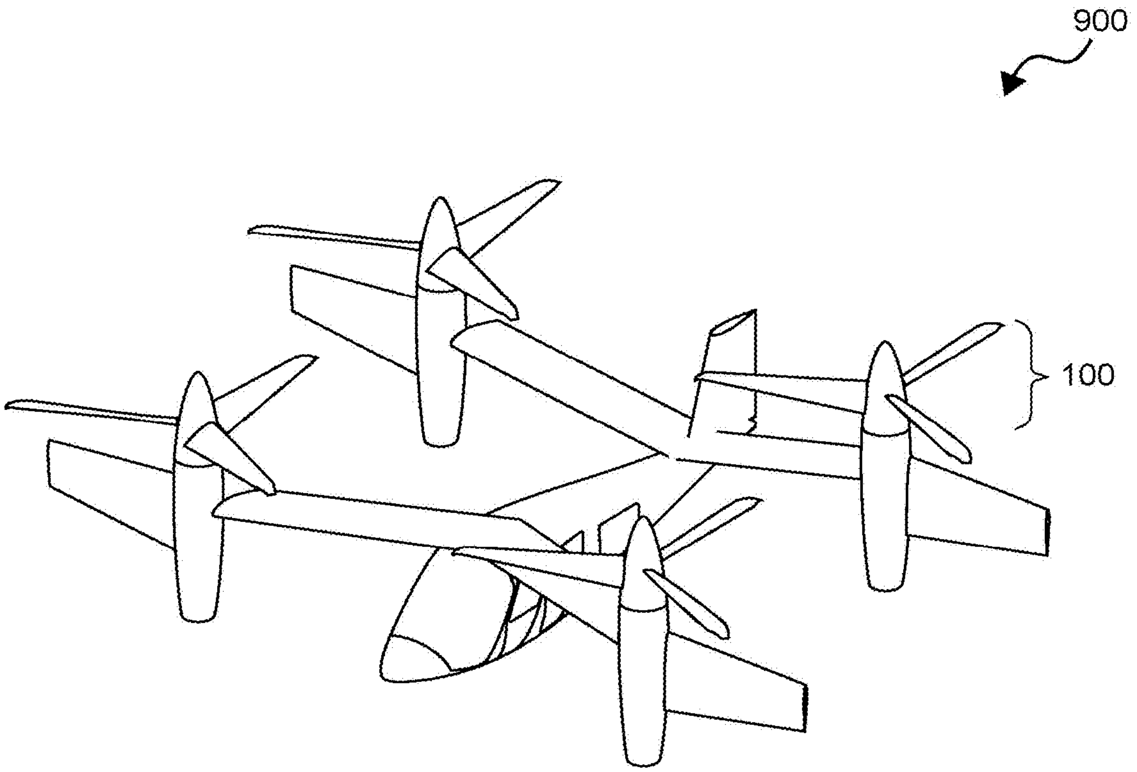
FIG. 9 illustrates an aircraft that comprises an embodiment of a proprotor blade retention system.

FIG. 9 depicts an aircraft 900 comprising an embodiment of a proprotor retention system 100. The aircraft 900 shown is a quad tiltrotor. Embodiments of a proprotor retention system as described herein can be particularly advantageous on tiltrotor aircraft because some embodiments of the system can be configured to sustain loads typical in all the modes of tiltrotor flight.

Some embodiments will be especially well suited for proprotors larger than 16 feet in diameter. However, the proprotors can be any diameter including: larger than 8 feet in diameter; larger than 10 feet in diameter; or, larger than 12 feet in diameter.

The proprotor blade retention system can be well suited for optimum speed tilt rotors such as the ones disclosed in U.S. Pat. No. 6,641,365B2 to Karem, incorporated herein by reference in its entirety.

Figure 10A:
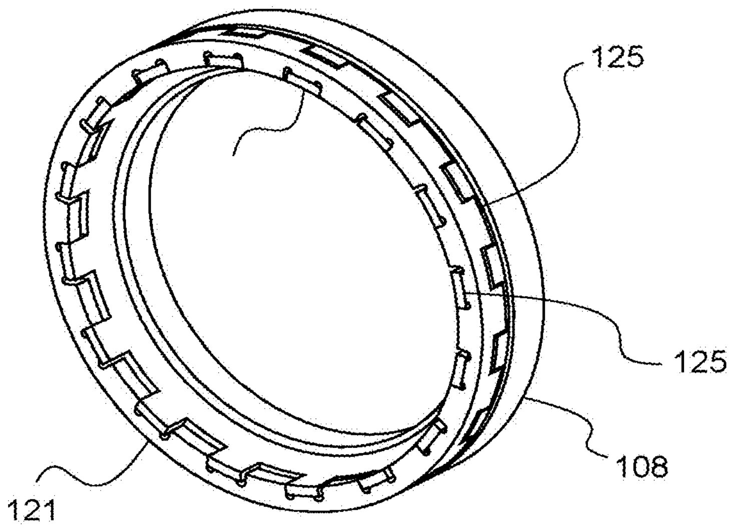
FIGS. 10A and 10B show views of an embodiment of a lock ring and preload nut assembly.
Figure 10B:
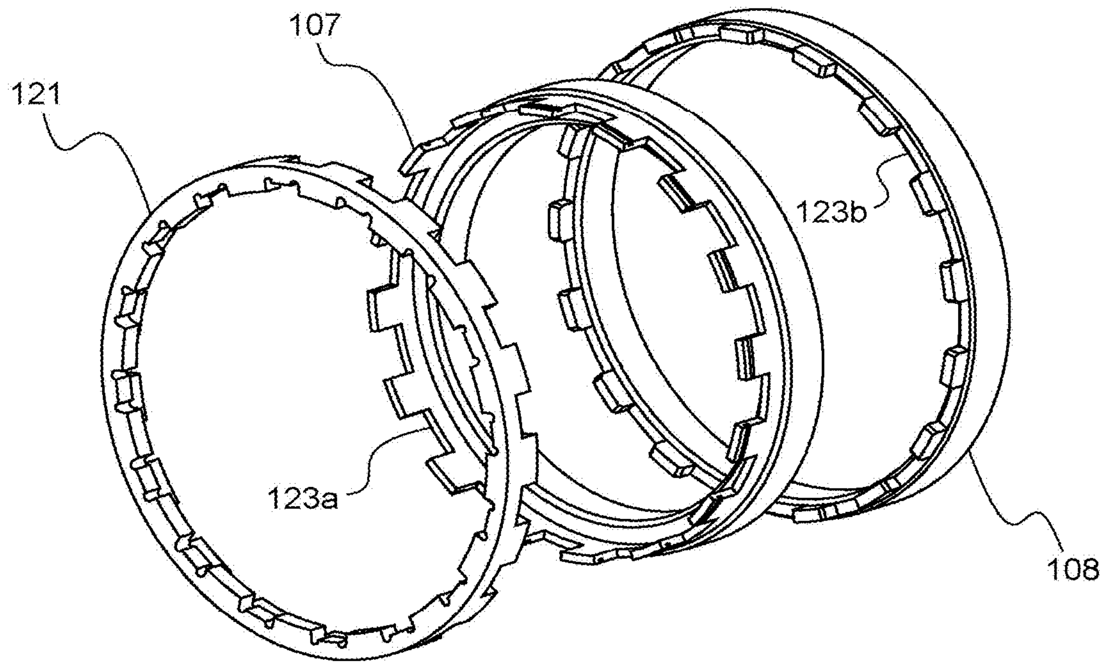

FIG. 10*a* shows an isolated view of the split collar 107, the bearing preload nut 108, and the lock ring 121. The preload nut 108 comprises a different number of locking grooves 123*b* than the split collar 107. The difference between the respective numbers of locking grooves 123*a* and 123*b* allows for very fine adjustment—while still allowing for teeth of the bearing preload nut 108, lock ring 121, and split collar to be strong. In the embodiment of FIGS. 10A and 10B, the bearing preload nut comprises 17 castellation notches, while the split collar 107 comprises 16 castellation notches.

In one embodiment, described herein is a proprotor blade retention system configured to resolve all proprotor loads without metal to composite fasteners. For example, one embodiment resolves all blade loads including: blade torsion loads; flap-wise moment loads; flap-wise shear loads; in plane moment loads; and, in plane shear loads.

Embodiments can be configured for use with any propeller, rotor, propulsor, proprotor or similar device, including a rigid rotor system or a hinged rotor system.

Conditional language in this application such as "can" or "may" is generally used to convey certain embodiments include certain features while other embodiments do not. In general, the features prefaced with similar conditional language should not be understood to be necessary to every embodiment-absent context specific indication to the contrary.

It should be understood that concepts described herein can be suited for any type of aircraft. However, some concepts described herein may be especially well suited for electric vertical takeoff and landing (eVTOL) aircraft.

The invention claimed is:

1. A proprotor system comprising:

a proprotor blade root;

a first and a second proprotor blade pitch bearing; and a bearing retention device configured to apply a preload force to the first and the second proprotor blade pitch bearing;

wherein the bearing retention device comprises:

- a split sleeve interposed between the proprotor blade root and the first proprotor blade pitch bearing;
- a split-collar groove on the split sleeve;
- a split-collar seated in the split-collar groove; and
- a bearing preload nut engaged with the split-collar configured to apply preload to the first proprotor blade pitch bearing;

wherein the preload force is configured to maintain the split sleeve in compression against the first proprotor blade pitch bearing and the second proprotor blade pitch bearing in a first and a second direction; and wherein the first direction is opposite the second direction.

2. The proprotor system of claim 1 wherein the split sleeve comprises metal.

3. The proprotor system of claim 1 wherein the split sleeve is configured to accommodate the proprotor blade pitch bearings.

4. The proprotor system of claim 1, further comprising a retainer configured to prevent the first proprotor blade or the second proprotor blade from loosening in an instance of a component failure.

5. The proprotor system of claim 4, wherein the retainer comprises the split collar.

6. The proprotor system of claim 5, wherein the split collar is configured to receive a force from the split sleeve.

7. The proprotor system of claim 6 wherein the split collar is larger in diameter than an inside diameter of the first proprotor blade pitch bearing.

8. The proprotor system of claim 1, wherein the proprotor blade root further comprises a blade pitch horn, wherein the blade pitch horn is connected to, or is a part of, the blade root insert, and wherein the blade pitch horn is connected to a pitch linkage.

9. A proprotor system comprising:
a proprotor blade root;
a blade pitch bearing;
a split sleeve interposed between the proprotor blade root and the blade pitch bearing,
wherein the split sleeve is configured to transfer a force from the proprotor blade root to a threaded split collar, the threaded split collar being seated in a groove of the split sleeve.

10. The proprotor system of claim 9, wherein an outside diameter of the threaded split collar is larger than an inside diameter of the blade pitch bearing.

11. An aircraft, comprising:
a proprotor blade;
a proprotor blade root of the proprotor blade;
a first and a second proprotor blade pitch bearing;

a bearing retention device configured to apply a preload force to the first proprotor blade pitch bearing and the second proprotor blade pitch bearing;
wherein the bearing retention device comprises:
a split sleeve interposed between the proprotor blade root and the first proprotor blade pitch bearing;
a split-collar groove;
a split-collar seated in the split-collar groove; and
a bearing preload nut engaged with the split-collar configured to apply preload to the first proprotor blade pitch bearing;
wherein the preload force is configured to maintain the split sleeve in compression against the first proprotor blade pitch bearing and the second proprotor blade pitch bearing in a first and a second direction; and
wherein the first direction is opposite the second direction.

12. An aircraft, comprising:
a proprotor;
a proprotor blade root of the proprotor;
a split sleeve interposed between the proprotor blade root and a blade pitch bearing,
wherein the split sleeve is configured to transfer a force from the proprotor blade root to a threaded split collar, the threaded split collar being seated in a groove of the split sleeve.

* * * * *